United States Patent
Lyon et al.

[11] Patent Number: 5,196,118
[45] Date of Patent: Mar. 23, 1993

[54] PERCUSSION TOOL FLUID FILTER APPARATUS

[75] Inventors: Leland H. Lyon; Richard L. Eggeling, both of Roanoke, Va.

[73] Assignee: Ingersoll-Rand Company, Woodcliff Lake, N.J.

[21] Appl. No.: 842,809

[22] Filed: Feb. 28, 1992

Related U.S. Application Data

[63] Continuation of Ser. No. 509,116, Apr. 16, 1990, abandoned.

[51] Int. Cl.$^5$ ............................................. B01D 29/11
[52] U.S. Cl. .................................. 210/315; 210/458; 55/487; 55/502
[58] Field of Search .................. 210/315, 458; 55/487, 55/502

[56] References Cited

U.S. PATENT DOCUMENTS

| | | |
|---|---|---|
| 2,524,336 | 10/1950 | Vokes . |
| 3,239,062 | 3/1966 | Rosaen ................................ 210/315 |
| 3,262,565 | 7/1966 | Silverwater ......................... 210/315 |
| 3,262,572 | 7/1966 | Cook ................................... 210/315 |
| 3,272,337 | 9/1966 | Elwell . |
| 3,273,715 | 9/1966 | Rosaen . |
| 3,283,902 | 11/1966 | Farris et al. ......................... 210/315 |
| 3,349,919 | 10/1967 | Rayer et al. ........................ 210/315 |
| 3,688,910 | 9/1972 | Johnson et al. . |
| 4,367,144 | 1/1983 | Peters et al. . |
| 4,810,272 | 3/1989 | Overby . |
| 4,818,397 | 4/1989 | Joy . |

Primary Examiner—Robert A. Dawson
Assistant Examiner—W. L. Millard
Attorney, Agent, or Firm—John J. Selko

[57] ABSTRACT

A filter apparatus for a percussion device to be powered by fluid pressure, which when the apparatus is in an assembled position, comprises a filter recess formed within a housing encasing the percussion device. An assembly fastener is disposed within the recess. A first filter is disposed about the assembly fastener. A filter support is disposed about the first filter. A second filter is mounted around the filter support. Both the first and the second filter have a filtering gauge size, and the filtering gauge of the first filter exceeds the filtering gauge of the second filter.

22 Claims, 2 Drawing Sheets

PERCUSSION TOOL FLUID FILTER APPARATUS

This application is a continuation of application Ser. No. 07/509,116, filed Apr. 16, 1990, now abandoned.

BACKGROUND OF THE INVENTION

This invention relates generally to a filter for a percussion device, and more specifically a filter for a percussion device to be contained within a housing thereof.

Previously, filters for percussion devices have been connected to a hose which supplies fluid to the percussion device. Due to the weight of the filter, this arrangement is clumsy, and results in excess damage to the filter.

The foregoing illustrates limitations known to exist in present percussion devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a filter apparatus comprising a housing, with a filter recess formed within the housing. An assembly fastener is disposed within the recess. A first filter is disposed about the assembly fastener. A filter support is disposed about the first filter. A second filter is mounted around the filter support.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
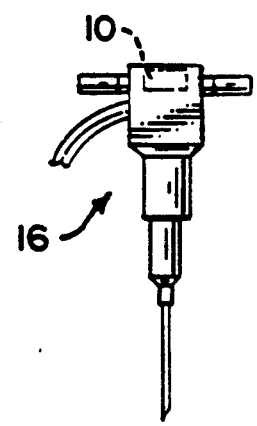
FIG. 1 is a side view of a percussion device illustrating one embodiment of the location of the filter apparatus of the instant invention.
Figure 2:
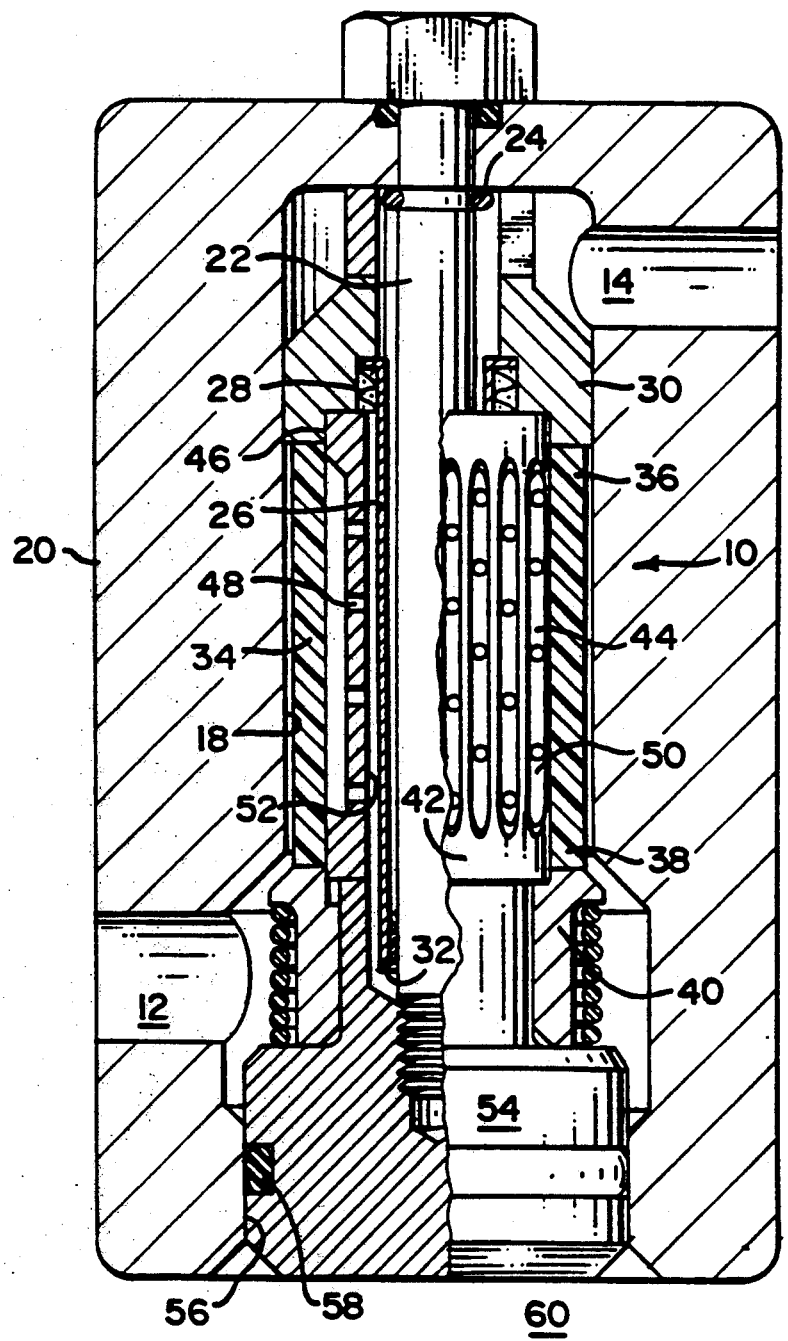
FIG. 2 is a split cross sectional view on the left side of the figure, and an elevation view on the right side of the figure, illustrating an embodiment of the filter apparatus of the instant invention, with the filter in the inserted position.
Figure 3:
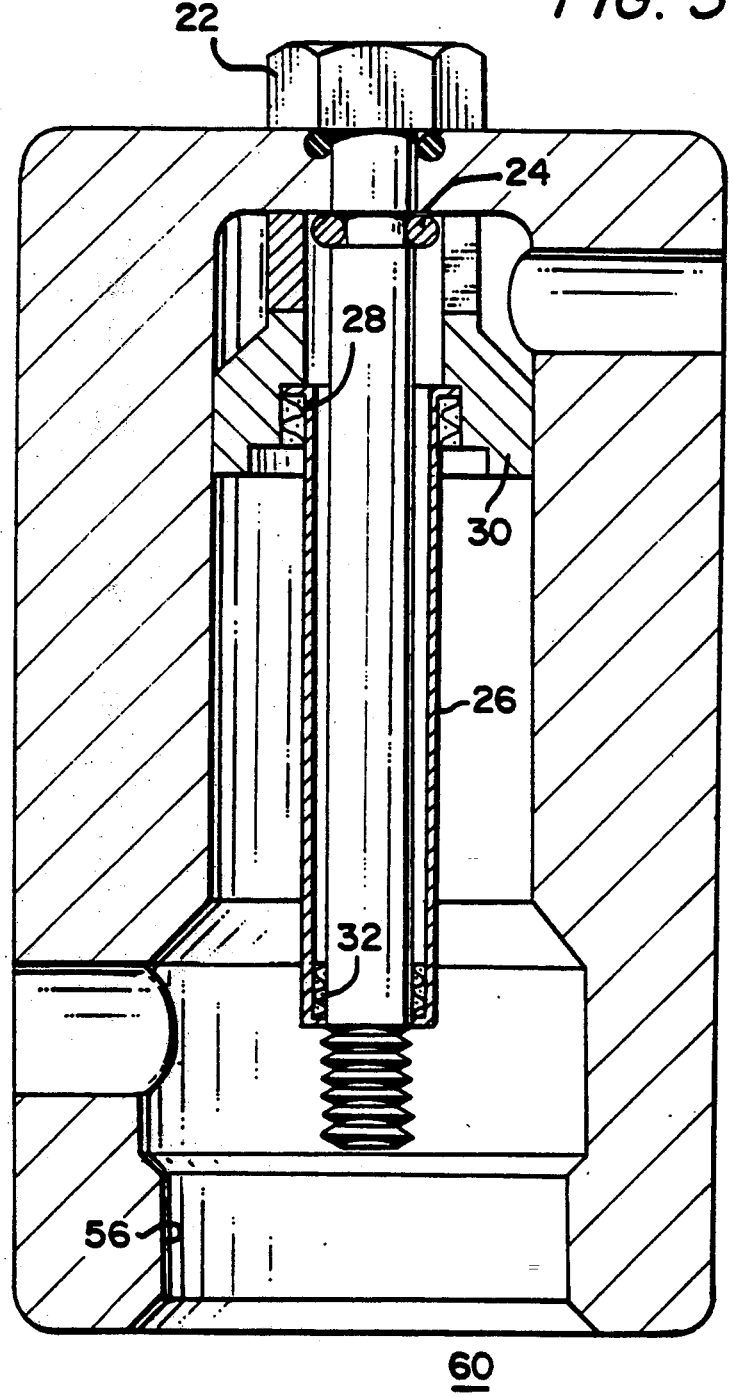
FIG. 3 is a view similar to FIG. 2, except with the filter support and the second filter removed.

One embodiment of a filter apparatus of the instant invention is shown generally at 10. A fluid filter inlet 12 and a fluid filter outlet 14 supply a fluid to, and remove the fluid from the filter apparatus 10, respectively.

Due to the contaminants present in the fluid, the filter is necessary to ensure longevity and proper operation of a percussion device 16 in which the filter apparatus 10 is mounted.

A filter recess 18 is formed in a housing 20 within the percussion device 16. The filter apparatus is designed to fit within, and conform to, the filter recess 10. An assembly fastener 22 extends within the filter recess 18.

In this embodiment, the assembly fastener 22 is a bolt member which is held in place by a fastener member retainer 24 which ensures proper axial retention of the assembly fastener 22 within the recess 18, while permitting rotation of the bolt 22 within recess 18

There are two filters in the instant invention. A first filter 26, which is permanently in place within the filter recess 18, ensures that no unfiltered fluid can pass to the fluid filter outlet 14. The first filter 26 may be constructed from a coarse metal screen, or similar material.

A first end 28 of the first filter 26 is sealingly mounted to a positioning means 30. A second end 32 of the first filter 26 is sealingly, yet slidingly, mounted about the assembly fastener 22. The first filter 26 is in close proximity to the the assembly fastener 22.

A second filter 34, which the fluid passing from inlet 12 to outlet 14 will encounter prior to the first filter 26, has a smaller gauge dimension than the first filter. When the filter apparatus 10 is fully assembled, the second filter will filter out all particles from the fluid which are to be filtered.

The second filter may be constructed from an inexpensive porous plastic material (or the like) for frequent replacement; or from a more expensive filter material which ma be cleaned often.

A first end 36 of the second filter 34 is biased, into a sealing engagement, against the positioning means 30. A second end 38 of the second filter 34 is biased, into a sealing engagement, by spring biased biasing member 40.

A filter support 42 is concentrically positioned between the first filter 26 and the second filter 34. The second filter 34 is mounted on, and supported by, the filter support 42.

Longitudinally extending grooves 44 are formed in an external wall 46 of the filter support 42. Apertures 48 are found in filter support 42 to connect a base portion 50 of the grooves 44 to an inner wall 52 of the filter support 42.

Any fluid passing through the second filter 34 will pass through grooves 44, and then the apertures 48, prior to encountering the first filter 26. The dimensions of the grooves 44 are large enough to permit adequate flow through the second filter 34, and yet are not so large as to permit material of the second filter 34, which may be flexible, to collapse into the grooves 44.

A base portion 54 of the filter support 42 forms a sealing engagement with a housing aperture 56, utilizing O-ring 58. This sealing engagement prevents fluid travelling from inlet 12 to outlet 14 from passing to atmosphere 60.

To remove the second filter 34, the bolt member 22 is rotated causing the filter support 42 to be displaced from filter recess 18 (along with the second filter 34 and the biasing member 40). The second filter 34 can then be separated from the filter support 42, and cleaned or replaced.

When the second filter 34 and the filter support 4 are removed from the housing, the first filter 26 restricts the passage of mud, dirt, etc, which may enter the housing and contaminate the internal workings of the percussion device 16. This configuration extends the life of the percussion device.

What is claimed is:

1. A filter apparatus comprising:
   a housing;
   a filter recess formed within the housing;
   an assembly fastener rotatably and fixedly connected to the housing, and disposed within the recess, said assembly fastener having a portion thereof extending outside of said housing;
   a first filter permanently in place within the recess, slidably disposed about the assembly fastener;

a filter support disposed about the first filter;

a second filter mounted around the filter support;

a plurality of grooves formed in an external wall of the filter support; and a plurality of apertures formed in the filter support, connecting an inner wall of the filter support to recessed portions of the grooves.

2. The apparatus as defined in claim 1, wherein the assembly fastener comprises a bolt member.

3. The apparatus as defined in claim 2, further comprising:

an assembly fastener retainer.

4. The apparatus as defined in claim 2, wherein the second filter and the filter support comprise a unit removable from the filter recess without removing the first filter.

5. The apparatus as defined in claim 4, wherein removing the unit from the filter recess necessitates loosening the bolt member.

6. The apparatus as defined in claim 1, further comprising:

positioning means for positioning the filter support in the housing.

7. The apparatus as defined in claim 6, wherein a first end of the first filter is in sealing contact with the assembly fastener, and a second end of the first filter is in sealing contact with the positioning means.

8. The apparatus as defined in claim 7, wherein when the second filter and the filter support are removed from the filter recess, any fluid passing from a fluid filter inlet to a fluid filter outlet must pass through the first filter.

9. The apparatus as defined in claim 1, further comprising:

a fluid inlet and a fluid outlet.

10. The apparatus as defined in claim 9 wherein fluid passing from the fluid inlet to the fluid outlet, through the filter apparatus passes through the second filter prior to passing through the first filter.

11. The apparatus as defined in claim 1, wherein both the first and the second filter have a filtering gauge size, and the filtering gauge of the first filter is greater than the filtering gauge of the second filter.

12. The apparatus as defined in claim 1, wherein the second filter is supported by the filter support.

13. The apparatus as defined in claim 1, wherein the second filter and the filter support comprise a unit, the unit is removable from the filter recess without removing the first filter.

14. The apparatus as defined in claim 1, wherein the filter support seals the filter recess from an outside surface of the housing.

15. The apparatus as defined in claim 1, wherein when the second filter and the filter support are removed from the filter recess, any fluid passage from a fluid filter inlet to a fluid filter outlet must first pass through the first filter.

16. The apparatus as defined in claim 1, wherein the first filter is concentrically mounted about the assembly fastener.

17. The apparatus as defined in claim 1, wherein the filter support is concentrically mounted about the first filter.

18. The apparatus as defined in claim 1, wherein the second filter is concentrically mounted about the filter support.

19. The apparatus as defined in claim 1, wherein the second filter is concentrically located about the first filter.

20. In a percussion device powered by fluid pressure, the improvement comprising: a filter apparatus comprising:

a filter recess formed within a portion of the percussion device;

an assembly fastener rotatably and fixedly connected to the housing, and disposed within the recess, said assembly fastener having a portion thereof extending outside of said housing;

a first filter permanently in place within the recess, slidably disposed about the assembly fastener; and a second filter which is mounted around the filter support.

21. In a percussion device powered by fluid pressure, the improvement comprising: a filter apparatus comprising:

hose means connected for supplying fluid pressure to the percussion device, said hose means being free of a filter;

a filter recess formed within a portion of the percussion device;

an assembly fastener support rotatably and fixedly connected to the housing, and disposed within the recess, said assembly fastener having a portion thereof extending outside of said housing;

a first filter permanently in place within the recess, slidably disposed about the assembly fastener;

a filter support disposed about the first filter; and a second filter which is mounted around the filter support.

22. In a percussion device powered by fluid pressure, the improvement comprising: a filter apparatus comprising:

hose means connected for supplying fluid pressure to the percussion device, said hose means being free of a filter;

a filter recess formed within a housing portion of the percussion device;

an assembly fastener support rotatably and fixedly connected to the housing, and disposed within the recess, said assembly fastener having a portion thereof extending outside of said housing;

a first filter permanently in place within the recess, slidably disposed about the assembly fastener;

a filter support disposed about the first filter;

means for providing a sealing engagement between said filter support and said percussion device; and a second filter which is mounted around the filter support.

* * * * *